US011137732B2

(12) United States Patent
Tucker et al.

(10) Patent No.: US 11,137,732 B2
(45) Date of Patent: Oct. 5, 2021

(54) FLOW ENGINE FOR BUILDING AUTOMATED FLOWS WITHIN A CLOUD BASED DEVELOPMENTAL PLATFORM

(71) Applicant: ServiceNow, Inc., Santa Clara, CA (US)

(72) Inventors: Christopher Tucker, San Diego, CA (US); Harry Thomas Nelson, San Diego, CA (US); Russell Samuel Sarbora, Kitty Hawk, NC (US)

(73) Assignee: ServiceNow, Inc., Santa Clara, CA (US)

( * ) Notice: Subject to any disclaimer, the term of this patent is extended or adjusted under 35 U.S.C. 154(b) by 72 days.

(21) Appl. No.: 16/716,174

(22) Filed: Dec. 16, 2019

(65) Prior Publication Data

US 2020/0209823 A1 Jul. 2, 2020

Related U.S. Application Data

(63) Continuation of application No. 15/587,075, filed on May 4, 2017, now Pat. No. 10,534,337.

(51) Int. Cl.
*G06F 9/46* (2006.01)
*G05B 19/042* (2006.01)
(Continued)

(52) U.S. Cl.
CPC ....... *G05B 19/0426* (2013.01); *G05B 19/048* (2013.01); *G06Q 10/0633* (2013.01);
(Continued)

(58) Field of Classification Search
CPC .............. G05B 19/0426; G05B 19/048; G06Q 10/0633
See application file for complete search history.

(56) References Cited

U.S. PATENT DOCUMENTS 6,321,229 B1 11/2001 Goldman
6,678,887 B1 1/2004 Halllman
(Continued)

FOREIGN PATENT DOCUMENTS

CN 101013362 B 5/2010
EP 3091487 A1 11/2016
(Continued)

OTHER PUBLICATIONS

Maurer et al.; "Merging Project Planning and Web-Enabled Dynamic Workflow Technologies", IEEE Internet Computing, Institute of Electrical and Electronics Engineers, Jun. 1, 2000, pp. 65-74 (XP002345613).

(Continued)

*Primary Examiner* — Camquy Truong
(74) *Attorney, Agent, or Firm* — Fletcher Yoder PC

(57) ABSTRACT

Creating and executing flow plans by performing at least the following: obtaining a run-time flow plan that comprises a trigger, a first operation, and a second operation, wherein the first operation precedes the second operation within the run-time flow plan and one or more input values of the second operation are linked to the first operation, determining whether one or more conditions of the trigger are met, execute the first operation based at least on the determination that the one or more conditions of the trigger are met, monitoring whether the second operation is ready for execution based at least on a determination that the one or more input values of a second action operation are ready, and executing the second action operation when the second action operation has been identified as ready for execution.

20 Claims, 9 Drawing Sheets

(51) Int. Cl.
*G05B 19/048* (2006.01)
*G06Q 10/06* (2012.01)
*H04L 29/08* (2006.01)

(52) U.S. Cl.
CPC ...... *H04L 67/00* (2013.01); *G05B 2219/2642* (2013.01); *H04L 67/10* (2013.01)

(56) References Cited

U.S. PATENT DOCUMENTS

| | | | |
|---|---|---|---|
| 7,020,706 | B2 | 3/2006 | Cates |
| 7,350,209 | B2 | 3/2008 | Shum |
| 7,716,353 | B2 | 5/2010 | Golovinsky |
| 7,769,718 | B2 | 8/2010 | Murley |
| 7,890,802 | B2 | 2/2011 | Gerber |
| 7,925,981 | B2 | 4/2011 | Pourheidari |
| 8,078,487 | B2 | 12/2011 | Li et al. |
| 8,151,261 | B2 | 4/2012 | Sirota |
| 8,234,623 | B2 | 7/2012 | Orofino, II et al. |
| 8,402,127 | B2 | 3/2013 | Solin |
| 8,612,408 | B2 | 12/2013 | Trinon |
| 8,646,093 | B2 | 2/2014 | Myers et al. |
| 8,795,322 | B2 | 8/2014 | Cully et al. |
| 8,832,652 | B2 | 9/2014 | Mueller |
| 8,914,182 | B2 * | 12/2014 | Casado ................. G05D 1/104 701/24 |
| 9,065,783 | B2 | 6/2015 | Ding |
| 9,098,322 | B2 | 8/2015 | Ante |
| 9,122,552 | B2 | 9/2015 | Whitney |
| 9,317,327 | B2 | 4/2016 | Apte |
| 9,363,252 | B2 | 6/2016 | Mueller |
| 9,535,737 | B2 | 1/2017 | Joy |
| 9,557,969 | B2 | 1/2017 | Sharma |
| 9,645,833 | B2 | 5/2017 | Mueller |
| 9,654,473 | B2 | 5/2017 | Miller |
| 9,766,935 | B2 | 9/2017 | Kelkar |
| 2007/0174101 | A1 | 7/2007 | Li et al. |
| 2014/0280961 | A1 | 9/2014 | Martinez et al. |
| 2015/0081629 | A1 | 3/2015 | Newman et al. |
| 2015/0193512 | A1 | 7/2015 | No et al. |
| 2015/0378784 | A1 | 12/2015 | Chik et al. |
| 2018/0321654 | A1 | 11/2018 | Tucker et al. |
| 2020/0209823 | A1 | 7/2020 | Tucker et al. |

FOREIGN PATENT DOCUMENTS

| | | |
|---|---|---|
| EP | 3399476 A1 | 11/2018 |
| WO | 2013122815 A1 | 8/2013 |

OTHER PUBLICATIONS

Canadian Examination Report for Canadian Application No. 2,980,914, dated Oct. 15, 2020, 3 pgs.

* cited by examiner

FLOW ENGINE FOR BUILDING AUTOMATED FLOWS WITHIN A CLOUD BASED DEVELOPMENTAL PLATFORM

CROSS-REFERENCE TO RELATED APPLICATION

This application is a continuation of and claims priority to U.S. patent application Ser. No. 15/587,075, filed on May 4, 2017, which is herein incorporated by reference in its entirety.

TECHNICAL FIELD

Embodiments described herein generally relate to cloud computing and in particular to create and execute flow plans within a cloud based developmental platform.

BACKGROUND ART

Cloud computing relates to the sharing of computing resources that are generally accessed via the Internet. In particular, the cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations in order to perform a variety computing functions that include storing and/or processing computing data. For enterprise and other organization users, cloud computing provides flexibility in accessing cloud computing resources without accruing up-front costs, such as purchasing network equipment, and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing a local network or individual software installations, software is typically licensed on a subscription basis, hosted on a remote machine, and accessed as needed. For example, users are generally able to access a variety of enterprise and/or information technology (IT) related software via a web browser. PaaS acts an extension of SaaS that goes beyond providing software services by offering customizability and expandability features to meet a user's needs. For example, PaaS can provide a cloud based developmental platform for users to develop, modify, and/or customize applications and/or automating enterprise operations without maintaining network infrastructure and/or allocating computing resources normally associated with these functions.

Within the context of automating enterprise, IT, and/or other organization-related functions (e.g., human resources (HR)), PaaS often provides users an array of tools to implement complex behaviors, such as enterprise rules, scheduled jobs, events, and scripts, to build automated processes and to integrate with third party systems. Although the tools for PaaS generally offer users a rich set of facilities for building automated processes for various enterprise, IT, and/or other organization-related functions, users typically implement custom scripts to perform the automated process. Requiring customized script to build automated processes may pose a challenge when attempting to address abstraction (e.g., providing domain-appropriate building blocks), code reuse (e.g., having defined application program interface (API) semantics), and/or codeless development. As such, continually improving the technology of developmental platforms that simplify the process for a user to design and run automated processes remains valuable in enhancing clouding computing services.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a system that obtains a run-time flow plan that comprises a trigger, a first operation and a second operation. Within the run-time flow plan the first operation precedes the second operation such that one or more input values of the second operation are linked to the first operation. When the system determines that one or more conditions of the trigger are met, the system executes the first operation based at least on the determination that the one or more conditions of the trigger are met. The system also monitors whether the second operation is ready for execution based at least on a determination that the one or more input values of a second action operation are ready. The system executes the second action operation when the second action operation has been identified as ready for execution.

In another embodiment, a method to execute a run-time flow plan that includes a trigger and multiple operations. Within the run-time flow plan a first operation of the multiple operations precedes a second operation of the multiple operation. The second operation can include an input signature with one or more input values that observe one or more output values of the first operation. The method executes the first operation based at least on the determination that the one or more conditions of the trigger are met. The method also monitors whether the second operation is ready for execution by determining that the input values of a second action operation are ready. The method executes the second action operation when the second action operation has been identified as ready for execution.

In yet another embodiment, a system for creating a trigger for an action flow plan that activates when one or more computing conditions are met. To create the action flow plan, the system defines a plurality of actions for the action flow plan that would execute after the trigger activates. Each of the actions comprises a respective sequence of action steps associated with respective inputs and outputs. The method receives from at least one user interface an instruction to publish the action flow plan and calls a flow plan builder to convert the action flow plan into a run-time flow plan for execution.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
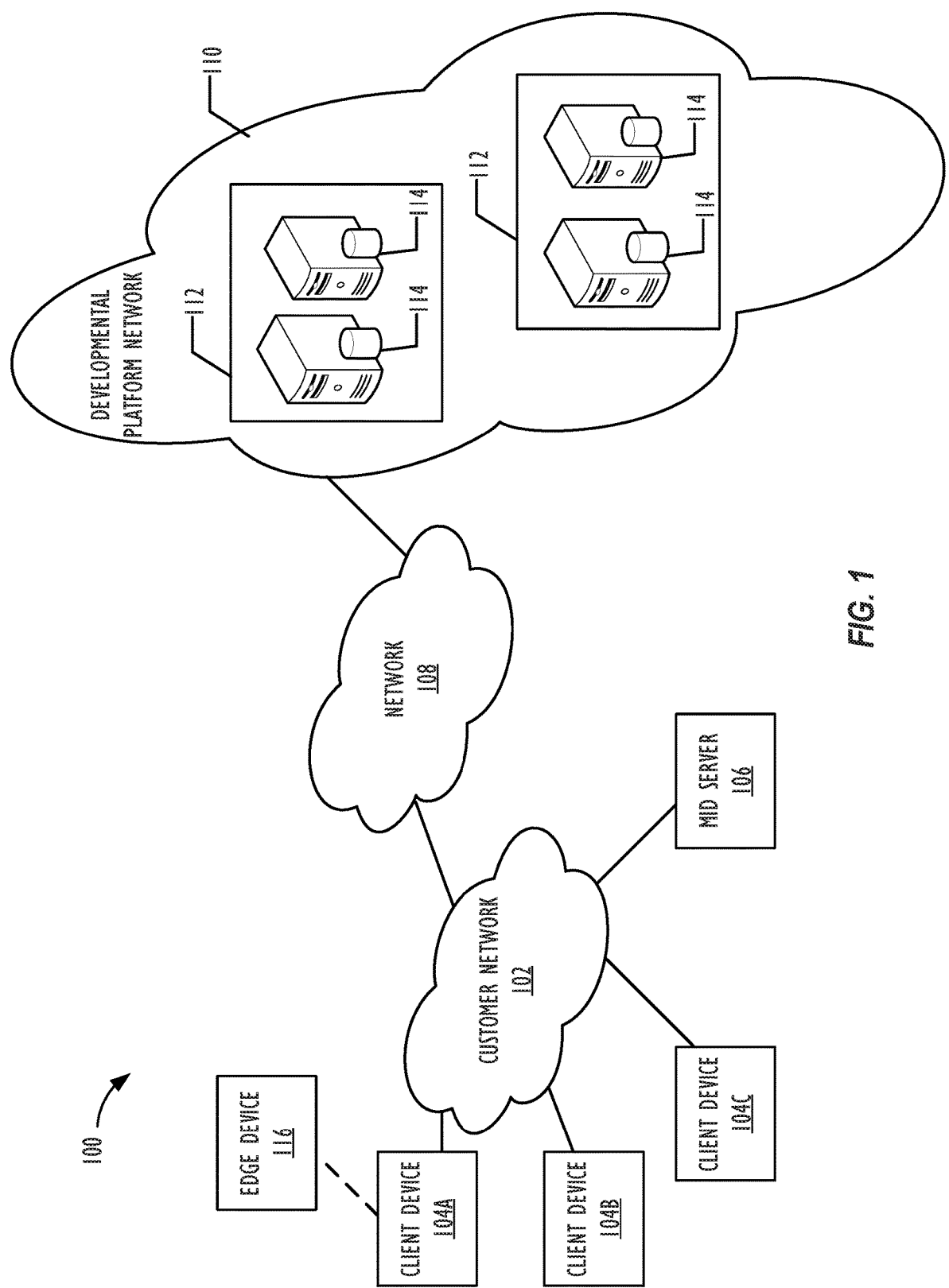
FIG. 1 is a schematic diagram of an embodiment of a cloud computing system where embodiments of the present disclosure may operate herein.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "computing system" refers to a single electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

As used herein, the term "flow plan" refers to a configured, automated process for addressing one or more tasks. In one or more embodiments, the tasks for the flow plan correspond to a variety of enterprise and/or other organization-relation functions. Categories of tasks that relate to enterprise and/or other organization functions include, but are not limited to HR operations, customer service, security protection, enterprise applications, IT management, and/or IT operation. In one embodiment, flow plans are created from a developmental platform, such as a Web 2.0 developmental platform written in Java® (JAVA is a registered trademark owned by Oracle America, Inc.).

As used herein, the term "global state" refers to one or more global parameters or global variables that are accessible for an entire application. Examples of parameters or variables for a global state include, but are not limited to process and task execution statuses and resource conditions. In one embodiment, a centralized decision-making component, such as a centralized controller, is able to track the global state and determine execution orders for operations within a workflow.

Various example embodiments are disclosed herein that create and execute flow plans within a cloud computing environment. To create and execute flow plans, a developmental platform includes a service hub system that constructs action flow plans and a flow engine that executes run-time versions of the action flow plans. The service hub system includes a flow designer user interface that presents to a user one or more actions and triggers for constructing an action flow plan, an action designer user interface that allows a user to construct actions out of action steps, and a web service API (e.g., Representational State Transfer (REST) API) to interface with a data model. The flow designer user interface, the action designer user interface, and the web service API drive the data model so that the action flow plan can be continuously updated and/or saved. Once the service hub system receives instructions to publish, the service hub system may call a flow builder API to generate a run-time version of the action flow plan based on the data model. Afterwards, a flow engine may execute the run-time flow plan without utilizing a global state to manage flow execution order. Instead, the flow engine may execute each operation within the run-time flow plan when it is ready to run and repopulates a queue as operations are executed until there are no remaining ready operations. An operation within the run-time flow plan may be ready to run when the operation's input values are ready and the flow engine has completed any predecessor operations.

FIG. 1 is a schematic diagram of an embodiment of a computing system 100, such as a cloud computing system, where embodiments of the present disclosure may operate herein. Computing system 100 may include a customer network 102, network 108, and developmental platform network 110. In one embodiment, the customer network 102 may be a local private network, such as local area network (LAN) that includes a variety of network devices that include, but are not limited to switches, servers, and routers. In another embodiment, the customer network 102 represents an enterprise network that could include one or more local area networks (LANs), virtual networks, data centers 112 and/or other remote networks. As shown in FIG. 1, the customer network 102 is able to connect to one or more client devices 104A-C so that the client devices are able to communicate with each other and/or with the developmental platform network 110. The client devices 104A-C may be computing systems and/or other types of computing devices generally referred to as Internet of Things that access cloud computing services, for example, via a web browser application or via an edge device 116 that may act as a gateway between the client device and the remote device. FIG. 1 also illustrates that the customer network 102 includes a management, instrumentation, and discovery (MID) server 106 that facilitates communication of data between the developmental platform network 110, other external applications, data sources, and services, and the customer network 102. Although not specifically illustrated in FIG. 1, the customer network 102 may also include a connecting network device (e.g., gateway or router) or a combination of devices that implement a customer firewall or intrusion protection system.

FIG. 1 illustrates that customer network 102 is coupled to a network 108. The network 108 may include one or more computing networks available today, such as other LANs, wide area networks (WAN), the Internet, and/or other remote networks, in order to transfer data between the client devices 104A-C and the developmental platform network 110. Each of the computing networks within network 108 may contain wired and/or wireless programmable devices that operate in the electrical and/or optical domain. For example, network 108 may include wireless networks, such as cellular networks (e.g., Global System for Mobile Communications (GSM) based cellular network), wireless fidelity (WiFi®) (WIFI is a registered trademark owned by WiFi Alliance Corporation)) networks, and/or other suitable radio based network as would be appreciated by one of ordinary skill in the art upon viewing this disclosure. The network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, the developmental platform network 110 is a remote network (e.g., a cloud network) that is able to communicate with the client devices 104A-C via the customer network 102 and network 108. The developmental platform network 110 provides additional computing resources to the client devices 104A-C and/or customer network 102. For example, by utilizing the developmental platform network 110, users of client devices 104A-C are able to build and execute applications, such as automated processes for various enterprise, IT, and/or other organization-related functions. In one embodiment, the developmental platform network 110 includes one or more data centers 112, where each data center 112 could correspond to a different geographic location. Each of the data center 112 includes a plurality of server instances 114, where each server instance 114 can be implemented on a physical computing system, such as a single electronic computing device (e.g., a single physical hardware server) or could be in the form a multi-computing device (e.g., multiple physical hardware servers). Examples of server instances 114 include, but are not limited to a web server instance (e.g., a unitary Apache installation), an application server instance (e.g., unitary Java® Virtual Machine), and/or a database server instance (e.g., a unitary MySQL® catalog (MySQL® is a registered trademark owned by MySQL AB A COMPANY)).

To utilize computing resources within the developmental platform network 110, network operators may choose to configure the data centers 112 using a variety of computing infrastructures. In one embodiment, one or more of the data centers 112 are configured using a multi-tenant cloud architecture such that a single server instance 114, which can also be referred to as an application instance, handles requests and serves multiple customers. In other words, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. Generally, implementing a multi-tenant cloud architecture suffer drawbacks, such as a failure to single server instance 114 causing outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the developmental platform network 110, and customer-driven upgrade schedules. An example of implementing a customer instance within a multi-instance cloud architecture will be discussed in more detail below when describing FIG. 2.

Figure 4:
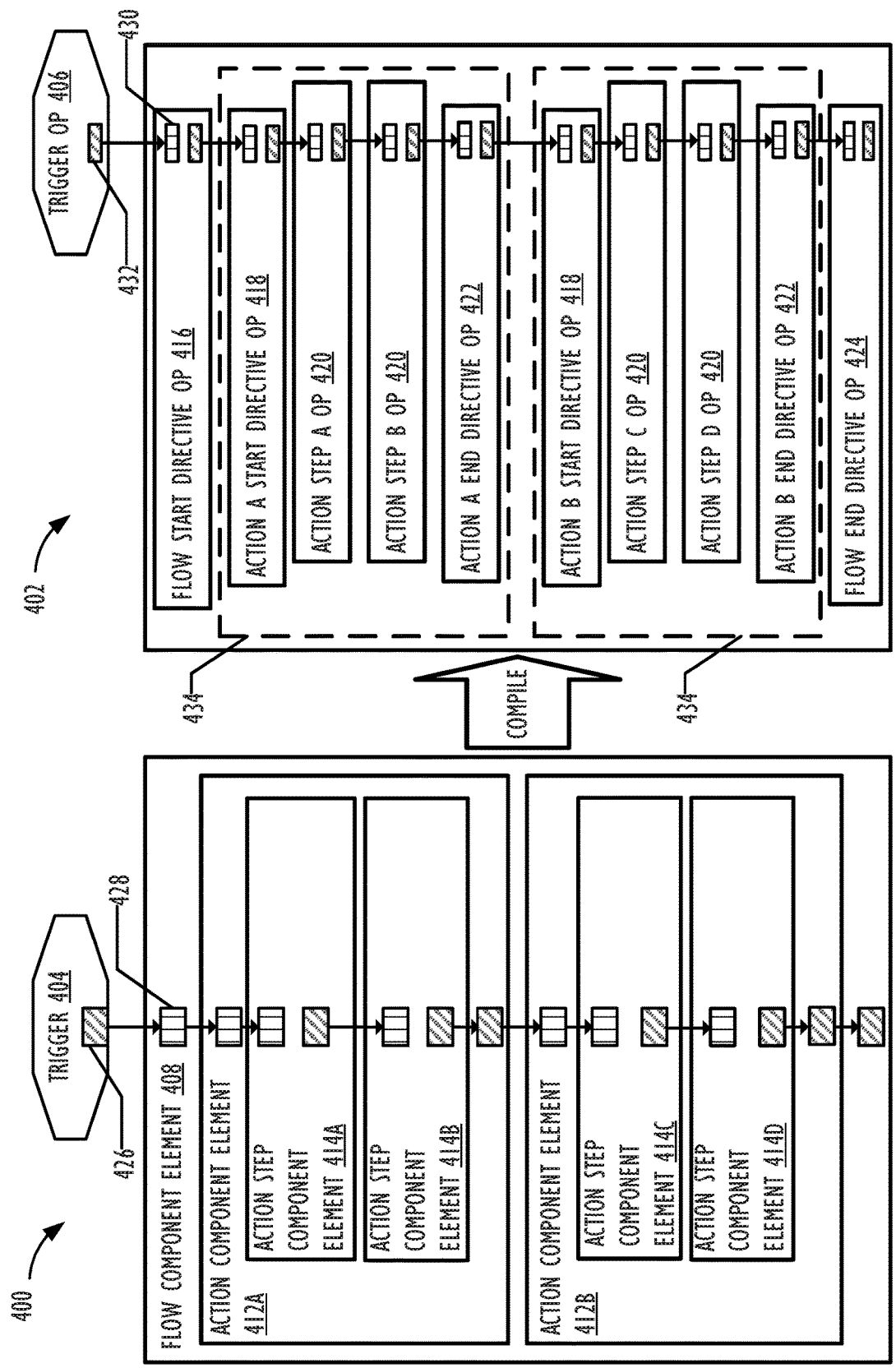
FIG. 4 is an illustration that maps the relationship between an action flow plan and a run-time flow plan.

In one embodiment, a customer instance includes a development platform that creates and executes flow plans. The development platform can include a flow plan creation component and flow plan execution component. Prior to executing a flow plan, the development platform can create flow plans using a service hub system. As used herein, the term "action flow plan" refers to a flow plan during the creation phase and prior to being converted (e.g. compiled) by a flow plan builder. In one embodiment, the action flow plan contains one or more triggers, actions, and action steps. A trigger refers to something that initiates when a certain condition or event is met (e.g., a record matching a filter is changed, a timer expires, and an inbound REST call arrives). An action refers to a sequence of action steps that processes some defined set of input values to generate a defined set of output values. The actions can be linked together and along with the triggers can form the action flow plan. During the flow plan execution phase, the development platform may execute a run-timer version of the action flow plan using one or more flow engines. As used herein, the term "run-time flow plan" refers to a flow plan during the execution phase and after being converted (e.g., compiled) by a flow plan builder. In one embodiment, the run-time flow plan can be implemented as Java® Script Object Notation (JSON) document that includes a plurality of definitions. FIG. 4, which is discussed in detail below, illustrates an example of an action flow plan and a run-time flow plan.

In reference to the flow plan creation phase, in one embodiment, the service hub system includes a flow designer user interface, an action designer user interface, and web service API that drives a data model that represents the action flow plan. A user may use the service hub system to create new action flow plans and/or make updates to an already existing action flow plan. The new action flow plans and/or changes made to existing action flow plan are stored as data models within the development platform network 110. When a user is satisfied with the created and/or updated action flow plan the user will subsequently publish the action flow plan. During publication of the action flow plan, a flow builder API coverts (e.g., compiles) the stored data model and generates a run-time flow plan that the development platform's flow engine executes.

Referring to the flow plan execution phase, in one embodiment, the development platform's flow engine executes run-time flow plans that are directed to acyclic graphs of operations that move data between operation nodes in a declarative manner as each operation completes. Each operation node in the run-time flow plan may have data signatures defining input and output values. Input values may be fixed values (e.g., hard coded to specific values), registered as an observer of a previous operation node, left unassigned, or a combination thereof. Operation nodes may also be registered as a descendent of a previous node. A flow engine executes an operation node once the operation node's input values have been supplied and once, if any, of the operation node's ancestor operation nodes have completed successfully. In one embodiment, operations can be written in Java® by extending a base operation class, where the contract is to implement a run method and declare data signatures. The flow engine can opaquely execute the operations within the flow plan and propagate data values based on the execution of the operations. Operations can also be synchronous by design and can be configured to execute in a single and/or multiple threads.

Additionally, a computing device associated with customer network 102, such as a MID server 106, can execute at least a portion of the run-time flow plan. In this embodiment, the development platform includes a second flow engine located on the MID server 106. The development platform may be able to offload the execution of the run-time flow plan to the MID server 106 in situations where the customer instance is unable to perform certain operations within the flow plan and/or would require too much computational resources. For example, the development platform may offload portions of the flow plan to the MID server 106 in order to obtain data and/or transfer data to other server instances 112 that the customer instance does not have permission to access. Utilizing a flow engine on a MID server 106 is described in more detail with reference to FIG. 6.

The development platform can create and execute flow plans that support a broad-range of uses cases pertaining to automating enterprise, IT, and/or other organization-related functions. The developmental platform may also be able to accommodate different user personas, such as IT workers and programmers to process-orientated non-IT line of enterprise customers. For example, one use case involves creating and executing a flow plan pertaining to security incident notification. In this use case, a user can design the flow plan's trigger to initiate when a recorded incident is created in a specific security category. In response to this trigger, the flow plan creates a task for the Security Response Team to immediately investigate the incident, and send potential security breach notifications. Additionally, the flow plan may as provide that when the Security Response Team closes out the created task, the recorded incident is updated with the finding of the Security Response Team. In another use case example, an HR department of an organization wants to create and execute a flow plan for a pre-on boarding process that creates employee records, sends out reminder notifications, and creates user accounts of various systems. HR personnel may want to configure created employee records via a client device using an HR application as well as what notifications need to be sent and when. Using the developmental platform, the HR application can construct pieces of the flow plan from the HR application's internal data model, create triggers that execute the various tasks when required, and have the flow plan start actions to create to appropriate records when a person is hired.

Figure 2:
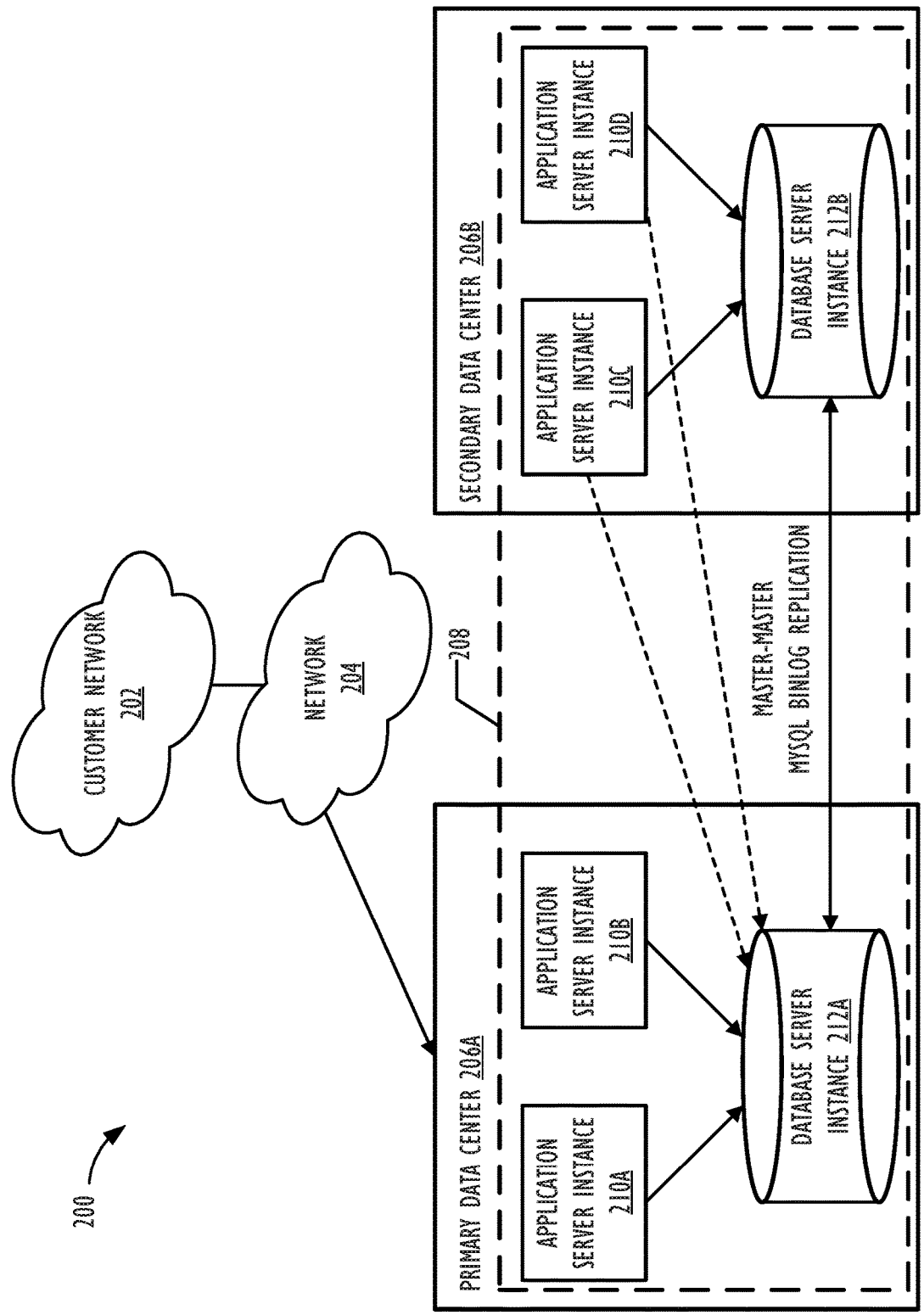
FIG. 2 is a schematic diagram of an embodiment of a multi-instance cloud architecture 200 where embodiments of the present disclosure may operate herein.

FIG. 2 is a schematic diagram of an embodiment of a multi-instance cloud architecture 200 where embodiments of the present disclosure may operate herein. FIG. 2 illustrates that the multi-instance cloud architecture 200 includes a customer network 202 that connects to two data centers 206a and 206b via network 204. Customer network 202 and network 204 may be substantially similar to customer network 102 and network 108 as described in FIG. 1, respectively. Data centers 206a and 206b can correspond to FIG. 1's data centers 112 located within developmental platform network 110. Using FIG. 2 as an example, a customer instance 208 is composed of four dedicated application server instances 210a-210d and two dedicated database server instances 212a and 212b. Stated another way, the application server instances 210a-210d and database server instances 212a and 212b are not shared with other customer instances 208. Other embodiments of the multi-instance cloud architecture 200 could include other types of dedicated server instances, such as a web server instance. For example, the customer instance 208 could include the four dedicated application server instances 210a-210d, two dedicated database server instances 212a and 212b, and four dedicated web server instances (not shown in FIG. 2).

To facilitate higher availability of the customer instance 208, the application server instances 210a-210d and database server instances 212a and 212b are allocated to two different data centers 206a and 206b, where one of the data centers 206 acts as a backup data center. In reference to FIG. 2, data center 206a acts as a primary data center 206a that includes a primary pair of application server instances 210a and 210b and the primary database server instance 212a for the customer instance 208, and data center 206b acts as a secondary data center 206b to back up the primary data center 206a for a customer instance 208. To back up the primary data center 206a for the customer instance 208, the secondary data center 206 includes a secondary pair of application server instances 210c and 210d and a secondary database server instance 212b. The primary database server instance 212a is able to replicate data to the secondary database server instance 212b. As shown in FIG. 2, the primary database server instance 212a replicates data to the secondary database server instance 212b using a Master- Master MySQL Binlog replication operation. The replication of data between data could be implemented by performing full backups weekly and daily incremental backups in both data centers 206a and 206b. Having both a primary data center 206a and secondary data center 206b allows data traffic that typically travels to the primary data center 206a for the customer instance 208 to be diverted to the second data center 206b during a failure and/or maintenance scenario. Using FIG. 2 as an example, if the application server instances 210a and 210b and/or primary data server instance 212a fails and/or is under maintenance, data traffic for customer instances 208 can be diverted to the secondary application server instances 210c and 210d and the secondary database server instance 212b for processing.

Although FIGS. 1 and 2 illustrate specific embodiments of a cloud computing system 100 and a multi-instance cloud architecture 200, respectively, the disclosure is not limited to the specific embodiments illustrated in FIGS. 1 and 2. For instance, although FIG. 1 illustrates that the developmental platform network 110 is implemented using data centers, other embodiments of the of the developmental platform network 110 are not limited to data centers and can utilize other types of remote network infrastructures. Moreover, other embodiments of the present disclosure may combine one or more different server instance into a single server instance. Using FIG. 2 as an example, the application server instances 210 and database server instances 212 can be combined into a single server instance. The use and discussion of FIGS. 1 and 2 are only examples to facilitate ease of description and explanation and are not intended to limit the disclosure to the specific examples.

Figure 3:
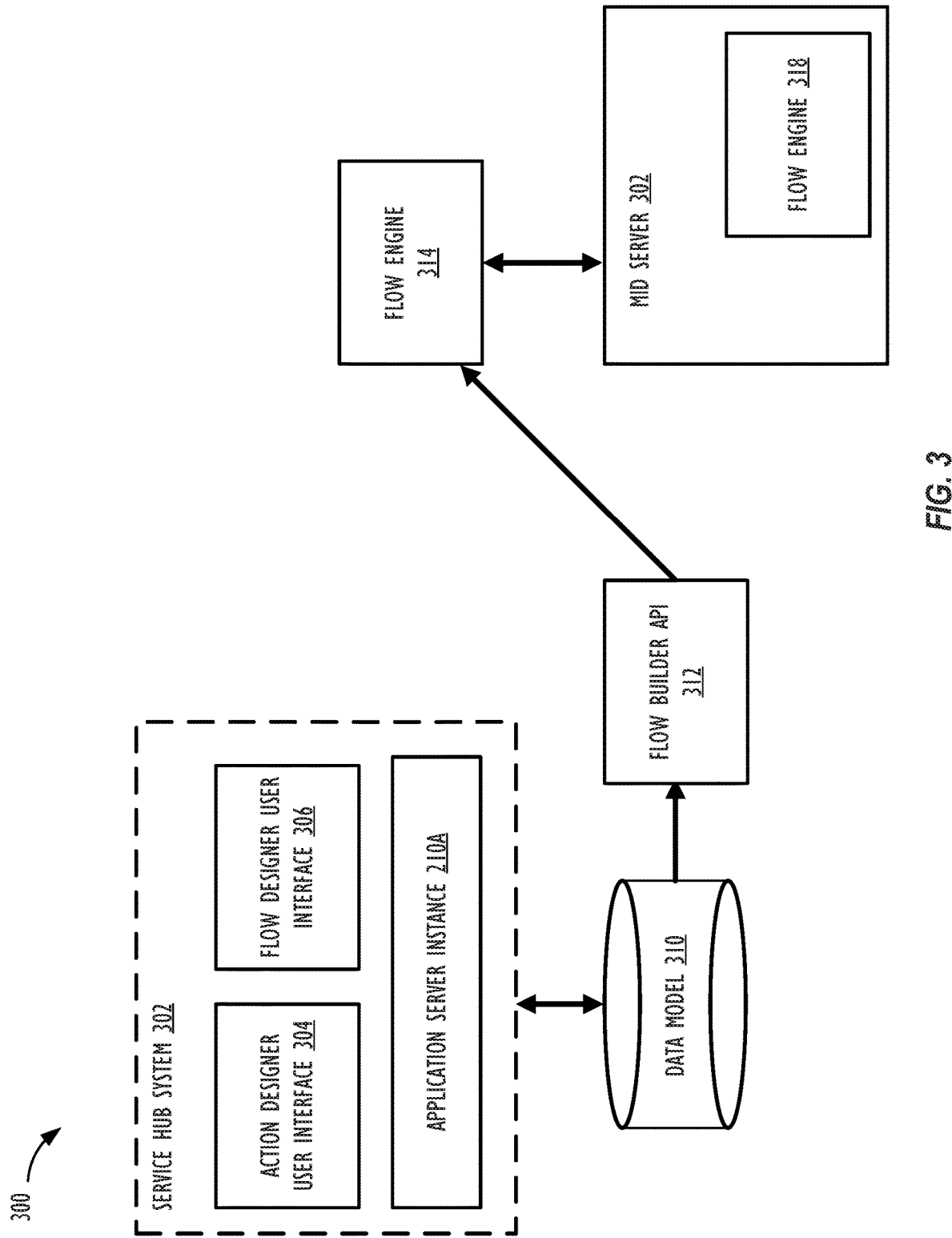
FIG. 3 is a schematic diagram of an embodiment of a development platform for creating and executing a flow plan.

FIG. 3 is a schematic diagram of an embodiment of a development platform 300 for creating and executing a flow plan. The development platform 300 may separate out the user experience in creating the action flow plan from the run-time considerations of storing and executing the run-time flow plan. In particular, the development platform 300 uses a service hub system 302 to create the action flow plan using database structures, and the flow engines 314 and 318 are configured to have no knowledge of the database structure of the action flow plans and/or actions designed with the service hub system 302. The flow engines 314 and 318 may execute a run-time version of the action flow plan, which in one embodiment are compiled JSON documents built via a flow plan builder API 312. Client devices, such as client devices 104A-C shown in FIG. 1, are able to call the flow plan builder API 312 to construct the JSON documents and may not need to adhere to any specific rules about how, where, or even whether, to the store definitions within the JSON documents. Additionally, by having the database representation of the action flow plan separate from the run-time flow plan, a flow engine 318 can be implemented on a MID server 316 using the same engine code base as being executed on a server instance. The run-time flow is constructed from operations with data dependencies between each of the operations. The flow engines 314 and 318 may be able to execute the operation such that the data dependencies are met along with any explicitly execution order dependencies. The details of how any given operation performs or executes its functions are abstracted away from the flow engines 314 and 318.

In one embodiment, the service hub system 302 may implemented using a Java®-based client device that would construct the active flow plan and request the flow engines 314 and/or 318 to run the active flow plan. The user could build a series of actions and variable bindings and chain them together into a flow plan. How the user constructs the action flow plan can be entirely up to the user. For example, an action flow plan can be metadata driven or it can be hard-coded. Once development platform 300 constructs and generates the action flow plan, the user can choose to save for future execution, or simply pass the action flow plan to the flow engines 314 and/or 318 for immediate execution. For purposes of this disclosure, service hub system 302 can also be generally referred to as and may be considered synonymous with the term "flow designer."

Creating a flow plan may involve defining what and how a flow plan performs an automated function. To create a flow plan, the service hub system 302 may include a flow designer user interface 306 and an action designer user interface 304. In one embodiment, the flow designer user interface 306 and an action designer user interface 304 may be located on a client device that receives user input. The flow designer interface 306 presents to a user actions and triggers to construct action flow plans. A user may be able to create the action flow plan based on employing a general pattern of when one or more specified conditions or events occur, perform one or more of the following actions. In other words, a user can create an action flow plan via the flow designer interface 306 by specifying one or more triggers for an action flow plan and one or more actions that follow in response to the triggers. For example, a user may create an action flow plan for a financial enterprise operation that triggers when a specific incident report is created (e.g., a created report that customer lost credit card). The creation of the specific incident report results in the creation of a financial action (e.g., lookup credit card account information). The creation of the financial action can use some of the data from the triggering event, which in this example would be the creation of the specific incident report, as an input signature (e.g., name of credit card holder and credit card number) for the created action. The action flow plan could also include other financial actions (e.g., cancelling credit card) with other input signatures.

The action designer user interface 304 allows the user to construct customizable actions within the action flow plan using action steps. Each action within the action flow plan can include one or more action steps. In one embodiment, each action step includes a configured action step template that specifies the operation to perform, defines the input and output data signatures for the action step, and what data values to pass to other action steps in the action flow plan. The input signatures for the action step can be a fixed value, registered as an observer of one of a previous action step's output, left unset, or combinations thereof. The action step may provide the input signature to the operation to produce an output data signature. The action step can then be configured to pass the output data signature to one or more other actions steps within the same action and/or other actions within the action flow plan.

FIG. 3 also depicts that the service hub system 302 includes a web service API 308, such as a REST API, to interface with a configuration management database (CMIDB) that creates a data model 310 representative of the action flow plan. As the flow designer interface 306 and the action designer user interface 304 receive user inputs relating to the creation of the action flow plan, the flow designer interface 306 and/or action designer user interface 304 may call a web service API 308, which may also be part of the service hub 302, to drive a data model 310 for the action flow plan. The data model 310 acts as a database structure that defines the action flow plan as a user continuously modifies the action flow plan. In one embodiment, once a user is done modifying the action flow plan, the user via the flow designer interface 306 and/or the action designer user interface 304 can save the action flow plan for later execution or provide instructions to publish the action flow plan.

When the user provides instructions to publish the action flow plan, the data model 310 goes through a compilation process by a calling the flow plan builder API 312. For purposes of this disclosure, flow plan builder API 312 can also be generally referred to as "flow plan builder." In one embodiment, the developmental platform 300 provides the flow plan builder API 312 to convert the action flow plan represented by data model 310 into a run-time flow plan, for example, a JSON document. In particular, the flow plan builder API 312 provides a structure to add action steps to actions and actions to the flow plan. Each element (e.g., action step or action) within the created flow plan has an input and output signature. Inputs can be fixed values (e.g., hard coded) or set to observe a previous element output. An example layout of an action flow plan and a run-time flow plan are shown and discussed in more detail in FIG. 4.

Action flow plans may not be executed by flow engines 314 and 318 until a user instructs a client device to publish the action flow plan. In one embodiment, publishing the action flow plan causes the development platform 300 to activate the action flow plan by reading the data model 310 using a glide-flow-service, call the flow plan builder API 312 to convert (e.g., compile) the data model 310, and store the generated run-time flow plan. In one embodiment, the run-time flow plan is stored as a JSON string in a trigger table. The specified type of trigger for the action flow plan may also determine what other records the compilation process creates to instantiate and execute an instance of the run-time flow plan. The flow engines 314 and 318 execute the run-time flow plan (e.g., JSON document) once one or more conditions or events occur that satisfy the trigger. During the execution of the run-time flow plan, the flow engine 314 and 318 annotates it run-time state information to determine whether operations within the run-time flow plan are ready to run. An operation within a run-time flow plan is ready to run when its input values are ready and the flow engine has completed any predecessor operations.

In one embodiment, when de-serialized from JSON, the run-time flow plan is composed of OpDatum objects that hold input values and output values, operation class references, execution state, application scope, and ancestor and predecessor operation references. The flow engines 314 and 318 execute the operations as they are ready. An operation within the run-time flow may be ready when all its input values report ready and the operations predecessors have completed. To execute the operation, the flow engines 314 and 318 call the execute method of the operation class. This sets the specified application scope and then calls the abstract run method. As the various run methods update the output values, registered input values observers are automatically notified. If there are no exceptions thrown, the operation is marked as having been completed. This process continues while there are ready operations. Once the flow engine 314 completes execution of the run-time flow plan, whether because the flow engine 314 has completed all operations, or because the flow engine 314 is waiting for external events, the run-time flow plan serializes into a context record.

FIG. 4 is an illustration that maps the relationship between an action flow plan 400 and a run-time flow plan 402. FIG. 4's depiction of the action flow plan 400 is a graphical representation of a data model prior to compilation. Recall the action flow plan 400 can be created using a developmental platform's service hub system that drives the data model representation of the action flow plan 400. As shown in FIG. 4, the action flow plan 400 may include a trigger component element 404 and a flow component element 408. The flow component element 408 includes a plurality of action component elements 412, where each action component element 412 includes action step component elements 414. The action component element 412 may be considered an abstraction boundary that is generally defined in domain terms and the action step component elements is typically defined in application platform based specific terms, such as a script and/or create, read, update and delete (CRUD) operations on a specific data structure. The trigger component element 404, action component elements 412 and action step component elements 414 can be customized, modified, and updated using the service hub system. For example, a user may select when the action flow plan 400 should execute by selecting and configuring the trigger component element 404.

Based on user inputs and instructions, the service hub system is able link input values within an input signature 428 of a given component element (e.g., flow component element 408, action component elements 412, and action step component elements 414) with output values within an output signatures 426 of other component elements and/or input values of component element located within the given component element. The linking between the input values and output values create an observer and observable relationship between the different component elements. For example, input values for one or more action step elements 414 located within the given action component element 412 can observe a given action component element's 412 input values. By linking the input values of a given component element to output values of other component elements, a user is able to create a serializable run-time flow plan 402 during execution. In addition to having input values of a given component element register as an observer of input values and/or output values of previous component elements, the input signature of the given component element register could include input values that have fixed values (e.g., hard coded), are left unset, or combinations thereof.

FIG. 4 depicts that the trigger component element 404 includes an output signature 426, and the flow component element 408, action component elements 412, and action step component elements 414 include both input signatures 428 and output signatures 426. The trigger component element's 404 output signature 426 links to the flow component element's 408 input signature 428. The flow component element's 408 input signature 428 then becomes action component element's 412a input signature 428, which then is linked to action step component element's 414a input signature 428. Action step component 414b's input signature 428 then observes action step component element's 414a output signature 426. Action step 414b's output signature 426 subsequently links to action 412a's output signature 426. Action component element's 412b input signature 428 then observes action component element's 412a output signature 426. In FIG. 4, the input signatures 428 and output signatures 426 for action step component element 414c's and 414d's located within action component element 412b follow a similar observer/observable relationship as described for action step component element 414a and 414b. Action component element's 412b output signature 426 is then linked to the flow component element's 408 output signature 426.

Once a user is done creating and/or modifying the action flow plan 400, a user may provide instructions to publish the action flow plan 400 via the service hub system. In response to receiving the publish instructions, the developmental platform's flow builder API converts (e.g., compiles) the action flow plan 400 to generate a run-time flow plan 402. The flow builder API provides a structure to add action step components 414 to action component element 412 and action a component element to flow component element 408. In one embodiment, as the flow builder API adds an action step component element 414 into an action component element 412, the flow builder API coverts the action step component 414 into an OpDatum record in the run-time flow plan's 402 action 434. As the flower builder API adds an action component element 412 to the flow component element 408, action component element's 412 operation plans are added to the flow operation 410.

FIG. 4 illustrates the resulting run-time flow plan 402 after compiling the action flow plan 400. In FIG. 4, the run-time flow plan 402 includes a trigger operation 406 and flow plan operation 410. The trigger operation 406 can include a responder that executes flow plan operation 410 stored with the trigger operation 406. Examples of types of trigger operations 506 include a record watcher trigger created to execute flow plan operation 410 for a record that meets specific conditions, scheduled triggers created to flow plan operation 410 periodically or once at a specific time, and REST triggers created to execute the flow plan operation 410 in response to inbound REST requests. Other embodiments of the action flow plan 400 and corresponding run-time flow plan 402 can include other types of triggers.

The flow plan operation 410 includes a serializable set of operations 416, 418, 420, 422, and 424, where each operation includes input signatures 430 and output signatures 432. As shown in FIG. 4, the flow plan operation 410 includes a flow start directive operation 416 that contains the input signature 430 of the flow plan operation 410, which observes the trigger operation's output signature 432. Similarly, the flow plan operation 410 includes a flow end directive operation 424 that hosts the output signature 432 for the flow plan operation 410. A flow engine that executes the flow plan operation 410 may minimize database operations within a CMDB to a read operation corresponding to flow start directive operation 416 and a write operation corresponding to the flow end directive operation 424. When executing the flow plan operation 410, the flow engine can avoid other database operations within the CMDB, such as managing a global state.

Each action 434 likewise gets an action start directive operation 418 and action end directive operation 422. Recall that when creating the action flow plan 400, a user may map the input signatures 430 of the action component elements 412 from the flow component element 408 or from other action component elements 412. The flow start directive operation 416, action start directive operation 418, and/or end directive operations 422 provide a structure in the flow plan operation 410 for the mapping of input signatures 430. Within an action 434, each action step operation 420 may become a single operation. The action step operation 420 may have its inputs values mapped from the action's 434 input signature, which is hosted on the action start directive operation 418, or from a predecessor action step operation 420. As shown in FIG. 4, input values within input signatures 430 may reference output values found within output signatures 432.

Although FIG. 4 illustrates specific embodiments of an action flow plan 400 and a run-time flow plan 402 that arranges actions (e.g., action component element 412A and action 434) in a linear sequence, the disclosure is not limited to the specific embodiments illustrated in FIG. 3. For instance, other embodiments of the action flow plan 400 and a run-time flow plan 402 could include branching, looping, and/or parallel execution semantics. Stated another way, the action flow plan 400 and a run-time flow plan 402 may be configured to include dynamic mutation operations that dynamically create actions and/or operations that execute repeatable operations over sets of data and/or while a condition state exists. Moreover, the action flow plan 400 and a run-time flow plan 402 may be configured to include conditional logic that optionally executes actions and/or operations based upon a condition state. The use and discussion of FIG. 4 is only an example to facilitate ease of description and explanation and are not intended to limit the disclosure to the specific examples.

Figure 5:
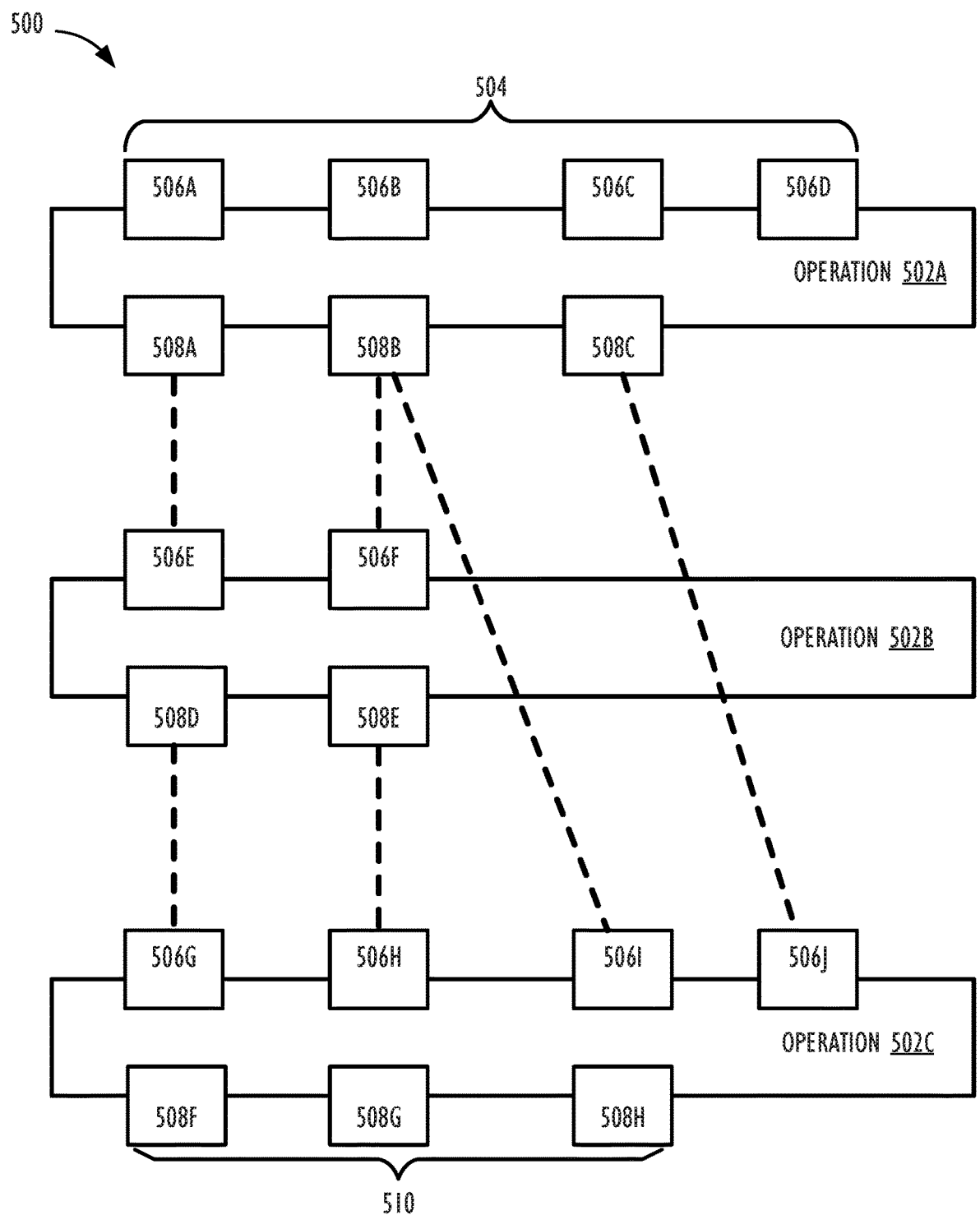
FIG. 5 illustrates a serializable set of operations that corresponds to a portion of a run-time flow plan.

FIG. 5 illustrates a serializable set of operations 502a-502c that corresponds to a portion of a run-time flow plan 500. For example and in reference to FIG. 4, operations 502a can correspond to an action start directive operation 418 and operations 502b and 502c correspond to action step operations 420. In another example in reference to FIG. 4, operations 502a-502c could correspond to action step operations 420. FIG. 5 depicts that the each operation 502a-502c in the run-time flow plan 500 has an input signature 504 and output signature 510. The input signature 504 includes input values 506a-506j and the output signatures 510 include output values 508a-508h. The input values 506a-506j and output values 508a-508h are linked together to implement a serializable, observer/observable relationship between the operations 502a-502c. As operations 502a-502c complete and populate their output values 508a-508h with data, the output values 508a-508h will notify all of its registered observer input values 506a-506j. When a flow engine queries the input values 506a-506j as to their status, the input values 506a-506j will report that they are not ready if the input values 506a-506j have not been notified of their value by their registered observable output values 508a-508h. If the input values 506a-506j have been notified, or are not observing anything, the input values 506a-506j report as ready.

As a serializable set of operations, operations 502a-502c are unable to execute until their observer input values 506 have been notified of their value and/or any predecessor operations 502 have been completed. As shown in FIG. 5, operation 502a may include an input signature 504a that includes four input values 506a-506d and an output signature 510a with three output values 508a-508c; operation 502b may include an input signature 504b that includes two input values 506e and 506f and an output signature 510b with two output values 508d and 508e; and operation 502c may include an input signature 504c that includes four input values 506g-506j and an output signature 510c with three output values 508f-508h. In response to operation 502a receiving and/or being notified of input values 506a-506d are ready, operation 502a executes to produce output values 508a-508c. Input values 506e and 506f of operation 502b observes the output values 508a and 508b, respectively, and input values 506i and 506j of operation 502c observes the output values 508b and 508c, respectively. Once operation 502a finishes execution, operation 502b's input values 506e and 506f are ready and operation 502b is then able to execute to produce the two output values 508d and 508e. The input values 506g and 506h from operation 502c observe the two output values 508d and 508e. After operation 502b executes and notifies operation 502c that input values 506g and 506h are ready and operation 502a executes and notifies operation 502c input values 506i and 506j are ready, operation 502c executes to produce output values 508f-508h.

Figure 6:
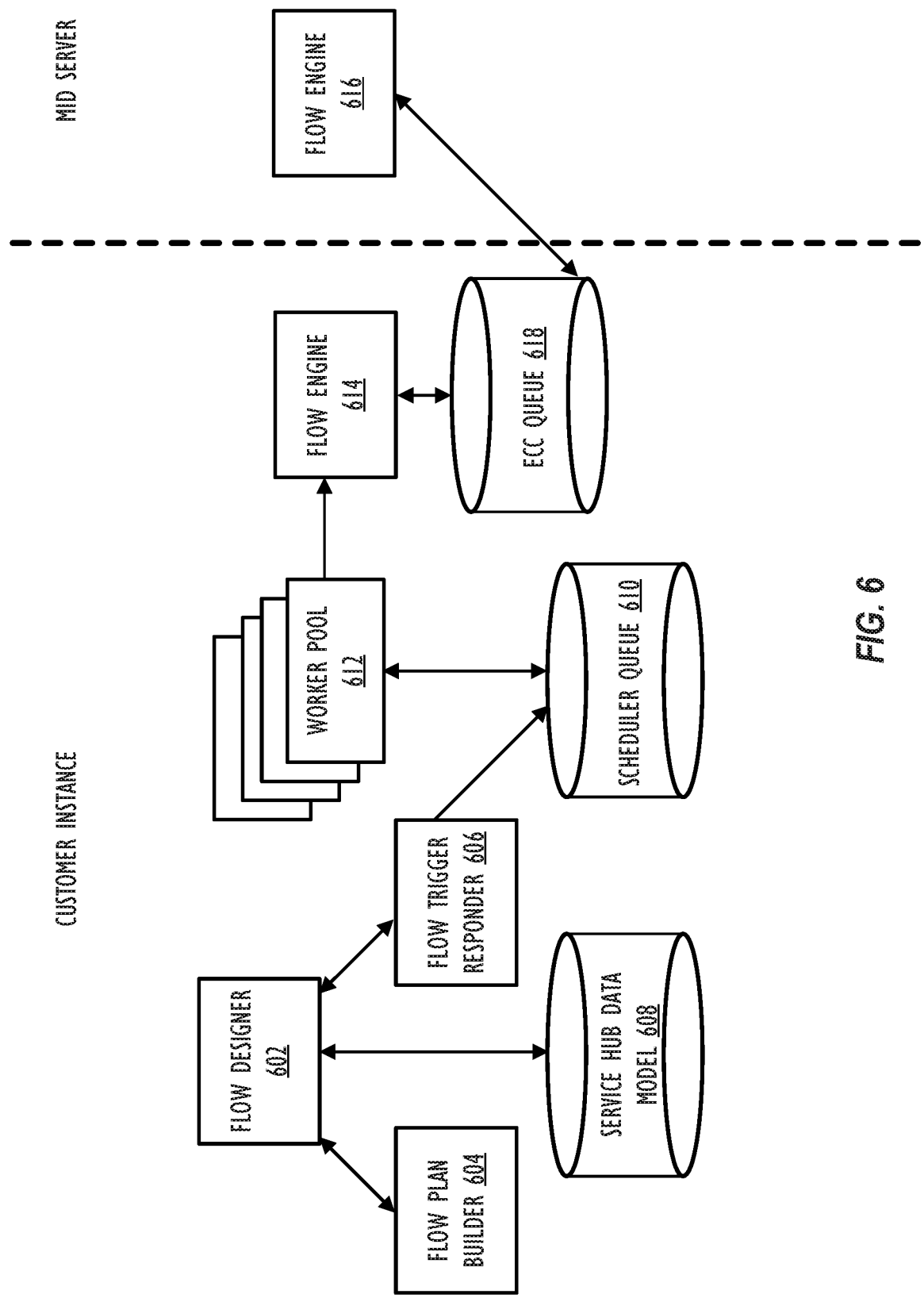
FIG. 6 is a schematic diagram of another embodiment of a development platform for creating and executing a flow plan.

FIG. 6 is a schematic diagram of another embodiment of a development platform 600 for creating and executing a flow plan. The flow designer 602, flow plan builder 604, and service hub data model 608 are similar to FIG. 3's service hub system 302, flow plan builder API 312, and data model 310, respectively. As discussed above in FIG. 3, the flow designer 602 can include one or more user interfaces for a user to customize, modify, and update an action flow plan. The flow designer 602 drives the service hub data model 608, which defines the action flow plan. Once a user instructs the flow designer 602 to publish and activate the action flow plan, the flow designer 602 reads (e.g., using a glide-flow-service) the service hub data model 608 and calls the flow plan builder 604 to convert the action flow plan to a run-time flow plan. Recall that as discussed in FIG. 4, the run-time flow plan may include a trigger operation and a flow plan operation.

Once the flow plan builder 604 generates the run-time flow plan, the flow designer 602 may send the trigger operation information associated with the run-time flow plan to a trigger responder 606. The trigger responder 606 monitors whether a computing operation satisfies one or more conditions or events specified by the trigger operation information. When the trigger responder 606 fires, the trigger responder 606 inserts a scheduled job for the run-time flow plan into a scheduler queue 610. Once the schedule job make its way through the scheduler queue 610, the worker pool 612 may assign one or more existing worker threads for the flow engine 614 to execute the run-time flow plan. In one embodiment, the flow engine 614 may use multiple worker threads to support execution of actions within the run-time flow plan. Having the trigger responder 606 insert a scheduled job within the scheduler queue 610 and subsequently assigning worker threads from worker pool 612 can minimize performance impact and disruption when executing the run-time flow plan. For example, the different actions for the run-time flow plan may run asynchronously from a main thread, and thus not block the main thread when running long operations for the run-time flow plan.

FIG. 6 illustrates that a flow engine 614 and a flow engine 616 can be implemented on both a customer instance and a MID server, respectively. For flow engine 616 to execute an action of a run-time flow plan on the MID server, the flow plan builder 604 generates a run-time flow plan that includes two action start directive operations and two action end directive operations. Using FIG. 4 as an example, instead of having the action 434 include a single set of an action start directive operation 418 and action end directive operation 422, the action 434 can instead include two pairs of action start directive operation 418 and action end directive operation 422. In one embodiment, the second pair of action start directive operation 418 and action end directive operation 422 may be located between the first pair of action start directive operation 418 and action end directive operation 422. When the flow engine 614 executes the first action start directive operation 418 within a run-time flow plan, the flow engine 614 propagates inputs for the second action start directive operation's 418 input signature. Once flow engine 614 propagates the input, the flow engine 614 can package all of the operations (e.g., action step operations) between the second action start directive operation 418 and action end directive operation 422 and forward the packaged operations to the External Communication Channel (ECC) queue 618. The ECC queue 618 then forwards the package operations as an ECC queue message to the MID server.

In one embodiment, the ECC queue 618 is a database table that is normally queried, updated, and inserted into by other computing system operating outside the customer instance. Each record in the ECC queue 618 may be a message, either from the customer instance (e.g., flow engine 614) to some other system or from the other system to the customer instance. The ECC queue 618 can act as a connection point (though not the only possible one) between the customer instance and other systems that integrate with it. As shown in FIG. 6, the ECC queue also acts as the connection between the customer instance and the MID server. As such, although FIG. 6 illustrates that the flow engine 616 is located on the MID server, other embodiments could have the flow engine 616 located on another remote computing system.

After MID server receives the ECC queue message, the flow engine 616 executes the received portion of the run-time flow plan. By doing so, the development platform 600 is able to offload the execution of the run-time flow plan to the MID server 106 in situations where the customer instance is unable to perform certain operations within the flow plan and/or would require too much computational resources. Once the flow engine 616 completes the execution of the received portion of the run-time flow plan, the flow engine 616 bundles and transmits its context records (e.g., run-time state information and/or other flow plan records) back to the ECC queue 618, which then forwards the received context records to the flow engine 616. Flow engine 616 may use the received context records to updates the flow engine's 616 run-time state information and resume executing operations based on the received context records. When flow engine 616 is done executing the run-time flow plan, either because the flow engine 616 has completed all operations or because it is waiting for external events, the run-time flow plan serializes to a context record.

Figure 7:
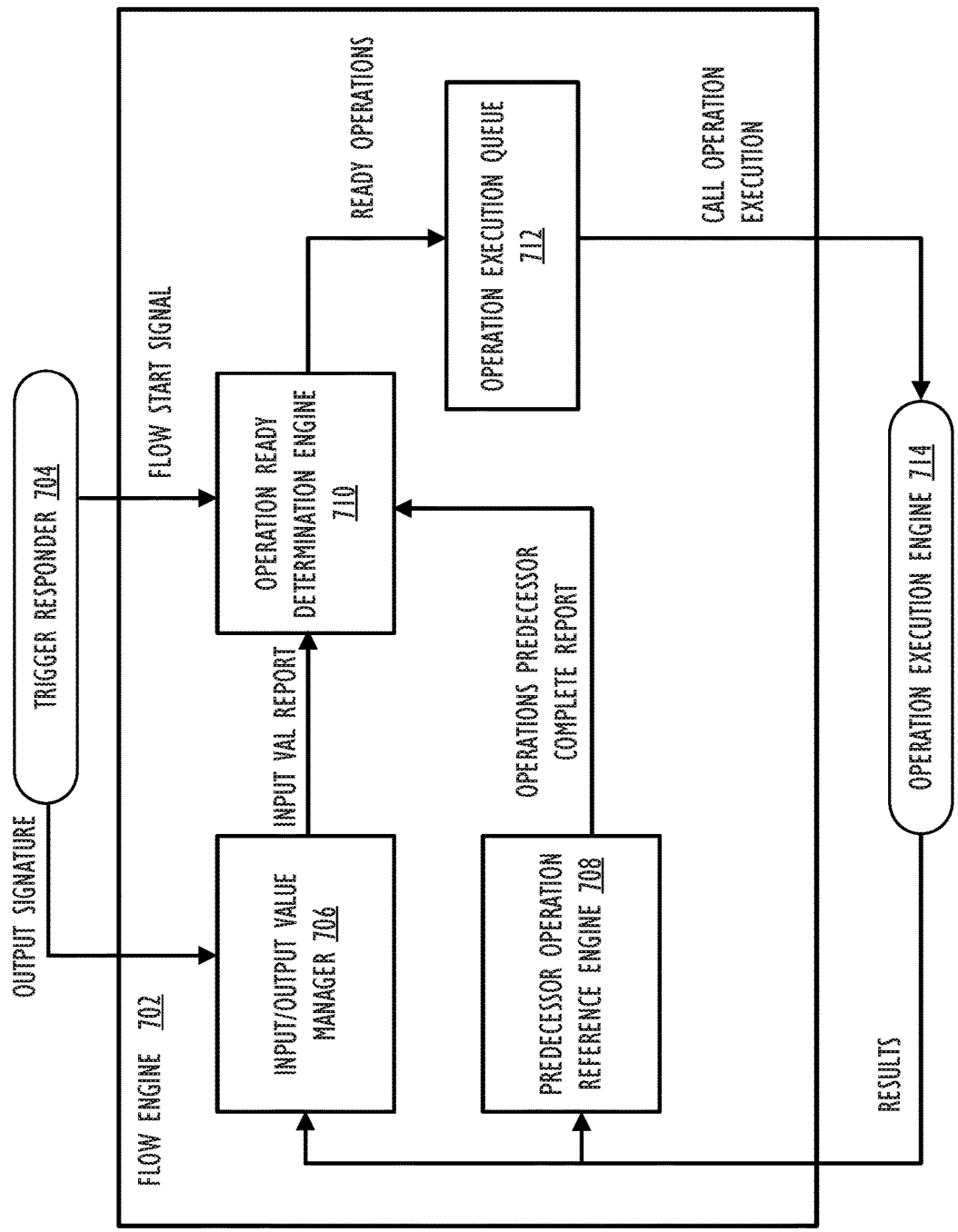
FIG. 7 is a schematic diagram of an embodiment of a flow engine for executing run-time flow plans.

FIG. 7 is a schematic diagram of an embodiment of a flow engine 702 for executing run-time flow plans. As shown in FIG. 7, a trigger responder 704, which is similar to the trigger responder 606 shown in FIG. 6, detects that one or more conditions or events satisfy a trigger for a run-time flow plan. The trigger responder 704 can send its output signature and a flow start signal to the flow engine 702. Specifically, the flow engine's 702 input/output value manager 706 receives the output signature from the trigger responder 704 and the operation ready determination engine 710 receives the flow start signal. The input/output value manager 706 maps and manages the observer/observable relationship for the different operations within the run-time flow plan. For example, the input/output value manager 706 may be aware of the input and output data signatures for each action step operation and what values to pass to other action step operation within the run-time flow plan. Based on the observer/observable relationship information, the input/output value manager 706 uses the output signature from the trigger responder 704 and/or other executed operations to generate an input value report that indicates which operations' input values are ready. As shown in FIG. 7, the input/output value manager 706 provides the input value report to the operation ready determination engine 710 for further evaluation.

Once the operation ready determination engine 710 receives the flow start signal from the trigger responder 704, the operation ready determination engine 710 begins to evaluate which operations are ready to run. FIG. 7 depicts that the operation ready determination engine 710 receives the input value report that indicates which operation's input values are ready and receives an operations predecessor complete report that indicates which predecessor operations have been completed. The operation ready determination engine 710 then uses the input value report and operations predecessor complete report to evaluate which operations are ready for execution. Rather than using a shared global state to determine the exact order of operation, the operation ready determination engine 710 is able to determine whether an operation is ready to run when its input values are ready and the flow engine has completed any predecessor operations. In other words, the flow engine 702 does not drive, coordinate, or manage when each operations should execute, but instead simplifies the evaluation process by detecting whether each operation's execution state have been met.

After the operation ready determination engine 710 determines which operations are ready for execution, the operation ready determination engine 710 sends the ready operation into an operation execution queue 712. At this point, the operation execution queue 712 may determine whether to execute one or more of the ready operations in a parallel or sequential fashion. To execute the read operations, the operation execute queue 712 may call the operation execution engine 714 that executes the ready operation using one or more worker threads. The results of the operation execution 714 are then sent back to the input/output value manager 706 and predecessor operation reference engine 708 to update and annotate the run-time state information for the run-time flow plan.

Figure 8:
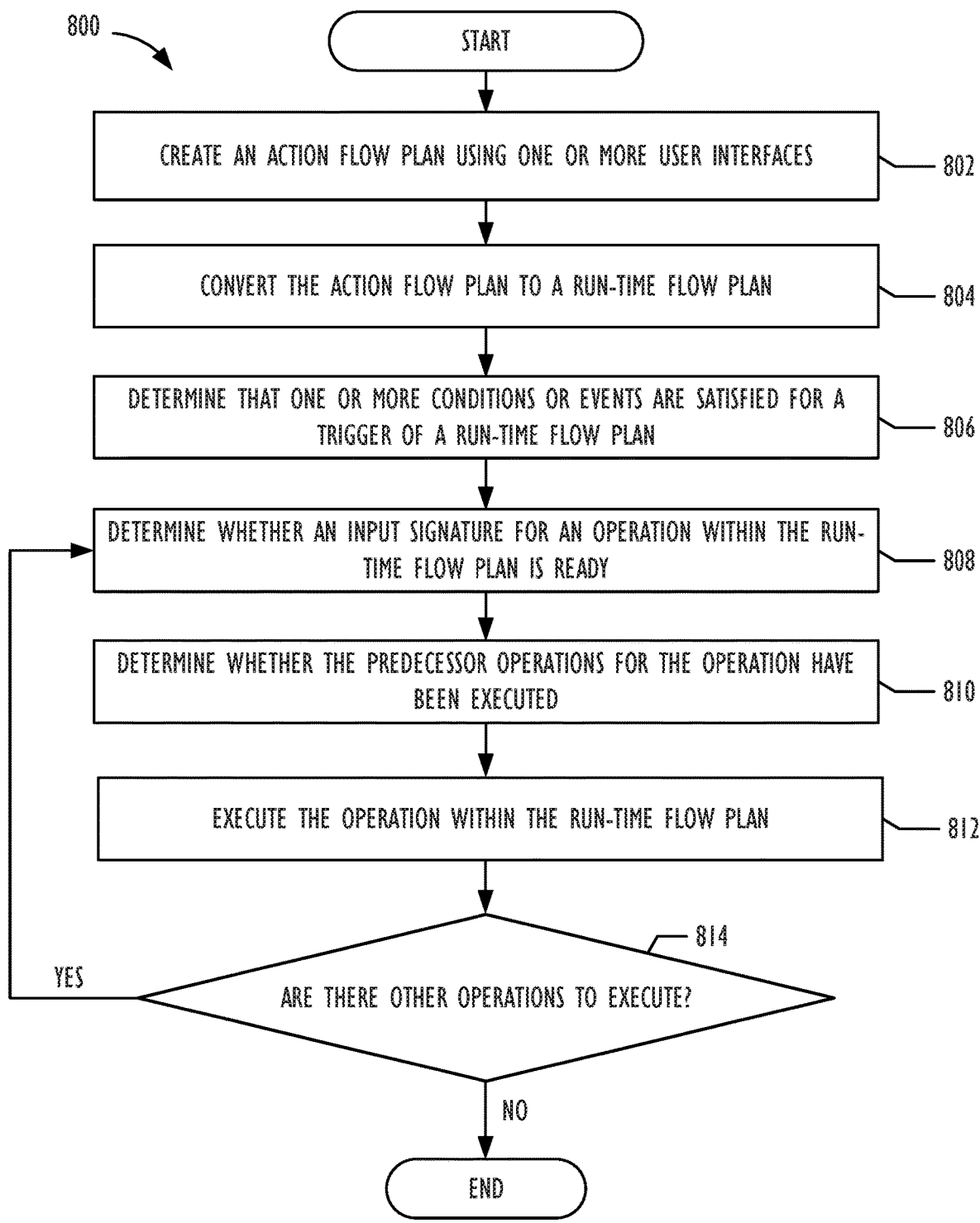
FIG. 8 is a flowchart of an embodiment of method that creates and executes a flow plan.

FIG. 8 is a flowchart of an embodiment of method 800 that creates and executes a flow plan. Method 800 may create and execute flows using hardware, software, or both. Using FIG. 3 as an example, method 800 may be implemented using the development platform 300, where the service hub 302 creates the action flow plan, the flow plan builder API 312 converts the action flow plan to a run-time flow plan, and the flow engine executes the run-time flow plan. In one embodiment, method 800 may be implemented on a flow engine located in a customer instance. In another embodiment, method 800 may be implemented on a two separate flow engines, one located on a customer instance and another located on another remote computing system, such as a MID server. Although FIG. 8 illustrates that the blocks of method 800 are implemented in a sequential operation, other embodiments of method 800 may have one or more blocks implemented in parallel operations.

Method 800 may start at block 802 to create an action flow plan using one or more user interfaces. As discussed in FIGS. 3 and 6, the user interfaces allow a user to create an action flow plan and drive a data model that represents the action flow plan. Method 800 may then move to block 804 to convert (e.g. compile) the action flow plan to a run-time flow plan. Method 800 may not convert the action flow plan to the fun-time flow plan until a user decides to publish the action flow plan. Once a user provides instructions via the user interfaces to publish the action flow plan, method 800 may use a flow plan builder for the conversion. From block 804, method 800 may continue to block 806 to determine that one or more conditions or events are satisfied for a trigger of the run-time flow plan.

Once a run-time flow plan is triggered for execution, method 800 may then move to block 808 to determine whether an input signature for an operation within the run-time flow plan is ready. Method 800 may also proceed to block 810 and determine whether the predecessor operations for the operation have been executed. As discussed above, operations within a run-time flow plan do not execute until the input values for the input signature are ready and/or any predecessor operations have finished executing. After determining that the input signatures are ready and predecessors operations have finished executing, method 800 may then move to block 812 to execute the operation within the run-time flow plan. Method 800 can then proceed to block 814 determine whether other operations need to be executed within the run-time flow plan. If no other operations need to be executed, method 800 ends; otherwise, method 800 returns back to block 808.

Figure 9:
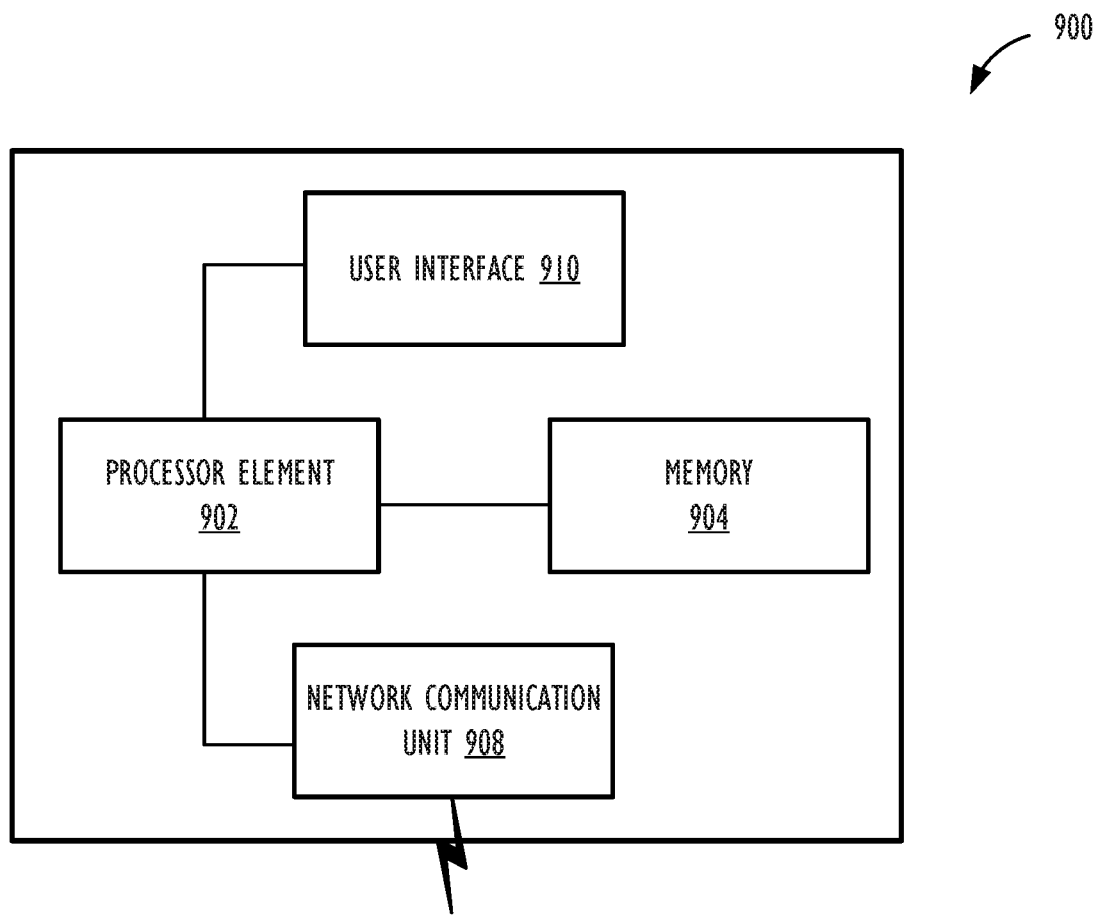
FIG. 9 is a block diagram illustrating another embodiment of computing system for use with techniques described herein.

Referring now to FIG. 9, a block diagram illustrates a computing device 900 that may be used for implementing the techniques described herein in accordance with one or more embodiments (e.g., developmental platform 300, developmental platform 600, flow engine 314, flow engine 614, and method 800). For example, the computing device 900 illustrated in FIG. 9 could represent a client device or a physical server device. As shown in FIG. 9, the computing device 900 can include can also include one or more input/output devices, such as a network communication unit 908 that could include a wired communication component and/or a wireless communications component 290, which can be coupled to processing element 902. The network communication unit 208 can utilized any of a variety of standardized network protocols, such as Ethernet, TCP/IP, to name a few of many protocols, to effect communications between devices and comprise one or more transceiver(s) that utilize the Ethernet, power line communication (PLC), WiFi®, and/or other communication methods.

The computing system 900 includes a processing element 902 that contains one or more hardware processors, where each hardware processor may have a single or multiple processor cores. In one embodiment, the processing element 902 may include at least one shared cache that store data (e.g., computing instructions) that are utilized by one or more other components of processing element 902. For example, the shared cache may be locally cache data stored in a memory for faster access by components of the processing elements 902. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 9, the processing element 902 may also include one or more other types of hardware processing components, such as graphics processing units (GPU), application specific integrated circuits (ASICs), field-programmable gate arrays (FPGAs), and/or digital signal processors (DSPs).

FIG. 9 illustrates that memory 904 may be operatively coupled to processing element 902. Memory 904 may be a non-transitory medium configured to store various types of data. For example, memory 904 may include one or more memory devices that comprise a non-volatile storage device and/or volatile memory. Volatile memory, such as random access memory (RAM), can be any suitable non-permanent storage device. The non-volatile storage devices can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage device may be used to store overflow data if allocated RAM is not large enough to hold all working data. The non-volatile storage device may also be used to store programs that are loaded into the RAM when such programs are selected for execution.

Persons of ordinary skill in the art are aware that software programs may be developed, encoded, and compiled in a variety computing languages for a variety software platforms and/or operating systems and subsequently loaded and executed by processing element 902. In one embodiment, the compiling process of the software program may transform program code written in a programming language to another computer language such that the processing element 902 is able to execute the programming code. For example, the compiling process of the software program may generate an executable program that provides encoded instructions (e.g., machine code instructions) for processor 902 to accomplish specific, non-generic, particular computing functions.

After the compiling process, the encoded instructions may then be loaded as computer executable instructions or process steps to processing element 902 from storage (e.g., memory 904) and/or embedded within the processing element 902 (e.g., cache). Processing element 902 can execute the stored instructions or process steps in order to perform instructions or process steps to transform the computing device into a non-generic, particular, specially programmed machine or apparatus. Stored data, e.g., data stored by a storage device, can be accessed by processing element 902 during the execution of computer executable instructions or process steps to instruct one or more components within the computing device 900.

A user interface 910 can include a display, positional input device (such as a mouse, touchpad, touchscreen, or the like), keyboard, or other forms of user input and output devices. The user interface 910 can be coupled to processor element 902. Other output devices that permit a user to program or otherwise use the computing device can be provided in addition to or as an alternative to network communication unit 908. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 900 may comprise other components well known in the art, such as sensors, powers sources, and/or analog-to-digital converters, not explicitly shown in FIG. 9. For ease of discussion, FIG. 9 explanation of these other components well known in the art.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application

What is claimed is:

1. A system, comprising:
   a processor; and
   a memory, accessible by the processor, the memory storing instructions, that when executed by the processor, cause the processor to perform operations comprising:
   receiving operational data from one or more hardware resources or one or more software resources in a managed network;
   determining that the operational data satisfies a trigger of a run-time flow plan associated with the managed network, wherein the run-time flow plan comprises a first operation and a second operation, and wherein one or more input values of the second operation are linked to the first operation;
   executing the first operation of the run-time flow plan in response to determining that the operational data satisfies the trigger of the run-time flow plan;
   receiving the one or more input values of the second operation after executing the first operation;
   determining whether one or more operational conditions associated with the second operation are sufficient to execute the second operation;
   transmitting the second operation of the run-time flow plan and the one or more input values of the second operation to a computing device associated with the managed network in response to determining that the one or more operational conditions are insufficient to execute the second operation; and
   receiving one or more output values associated with the second operation from the computing device.

2. The system of claim 1, wherein the one or more operational conditions comprise an availability of computational resources to execute the second operation.

3. The system of claim 1, wherein the one or more operational conditions comprises respective access permissions to one or more additional computing devices associated with the second operation.

4. The system of claim 1, wherein the computing device is configured to execute the second operation after receiving the second operation and the one or more input values of the second operation.

5. The system of claim 1, wherein the second operation of the run-time flow plan and the one or more input values of the second operation are transmitted to the computing device via an external communication channel (ECC) queue.

6. The system of claim 1, wherein the run-time flow plan comprise a third operation configured to execute in parallel with the first operation.

7. The system of claim 6, wherein one or more additional input values of the second operation are linked to the third operation, and transmitting the second operation of the run-time flow plan and the one or more input values of the second operation to the computing device comprises transmitting the second operation of the run-time flow plan, the one or more input values of the second operation, and the one or more additional input values of the second operation to the computing device.

8. A method, comprising:
receiving operational data from one or more hardware resources or one or more software resources in a managed network;
determining that the operational data satisfies respective triggers of one or more run-time flow plans associated with the managed network, wherein each run-time flow plan comprises a first operation and a second operation, and wherein one or more input values of the second operation are linked to the first operation;
executing respective first operations of the one or more run-time flow plans in response to determining that the operational data satisfies the respective triggers of the one or more run-time flow plans;
receiving one or more respective input values of respective second operations of the one or more run-time flow plans after executing the respective first operations;
transmitting the respective second operations of the one or more run-time flow plans and the one or more respective input values of the respective second operations to a computing device associated with the managed network; and
receiving one or more respective output values associated with the respective second operations from the computing device.

9. The method of claim 8, comprising determining whether respective operational conditions associated with the respective second operations are sufficient to execute the respective second operations before transmitting the respective second operations of the one or more run-time flow plans and the one or more respective input values of the respective second operations to the computing device.

10. The method of claim 9, wherein transmitting the respective second operations of the run-time flow plans and the one or more respective input values of the respective second operations to the computing device is in response to determining that the respective operational conditions are insufficient to execute the respective second operations.

11. The method of claim 9, wherein the respective operational conditions comprise an availability of computational resources to execute the respective second operations.

12. The method of claim 9, wherein the respective operational conditions comprise respective access permissions to one or more additional computing devices associated with the respective second operations.

13. The method of claim 8, wherein the one or more run-time flow plans comprise respective third operations configured to execute in parallel with the respective first operations.

14. The method of claim 8, wherein one or more respective additional input values of the respective second operations are linked to respective third operations, and transmitting the respective second operations of the one or more run-time flow plans and the one or more respective input values of the respective second operations to the computing device comprises transmitting the respective second operations of the one or more run-time flow plans, the one or more respective input values of the respective second operations, and the one or more respective additional input values of the respective second operations to the computing device.

15. A non-transitory, computer-readable medium, comprising instructions that when executed by one or more processors, cause the one or more processors to perform operations comprising:
receiving operational data from one or more hardware resources or one or more software resources in a managed network;
determining that the operational data satisfies a trigger of a run-time flow plan associated with the managed network, wherein the run-time flow plan comprises a first operation and a second operation, and wherein one or more input values of the second operation are linked to the first operation;
executing the first operation of the run-time flow plan in response to determining that the operational data satisfies the trigger of the run-time flow plan;
receiving the one or more input values of the second operation after executing the first operation; and
transmitting the second operation of the run-time flow plan and the one or more input values of the second operation to a computing device associated with the managed network in response to determining that one or more operational conditions are insufficient to execute the second operation.

16. The non-transitory, computer-readable medium of claim 15, wherein the operations comprise determining whether one or more operational conditions associated with the second operation are sufficient to execute the second operation.

17. The non-transitory, computer-readable medium of claim 16, wherein transmitting the second operation of the run-time flow plan and the one or more input values of the second operation to the computing device is in response to determining that the one or more operational conditions are insufficient to execute the second operation.

18. The non-transitory, computer-readable medium of claim 16, wherein the one or more operational conditions comprise an availability of computational resources to execute the second operation.

19. The non-transitory, computer-readable medium of claim 16, wherein the one or more operational conditions comprise respective access permissions to one or more additional computing devices associated with the second operation.

20. The non-transitory, computer-readable medium of claim 15, wherein the second operation of the run-time flow plan and the one or more input values of the second operation are transmitted to the computing device via an external communication channel (ECC) queue.

* * * * *